United States Patent
Chuan

(10) Patent No.: US 7,089,643 B2
(45) Date of Patent: Aug. 15, 2006

(54) METHOD FOR FORMING GROOVES ON TORSION WRENCH

(76) Inventor: Lee Chang Chuan, No. 429, Zhong Zheng Rd., Cao Tun Zhen, Nan Tou Hsien (TW)

( * ) Notice: Subject to any disclaimer, the term of this patent is extended or adjusted under 35 U.S.C. 154(b) by 87 days.

(21) Appl. No.: 10/841,333

(22) Filed: May 7, 2004

(65) Prior Publication Data
US 2005/0246882 A1    Nov. 10, 2005

(51) Int. Cl.
*B23Q 3/00*   (2006.01)
*B21D 39/03*   (2006.01)

(52) U.S. Cl. .......................................... 29/464; 29/428
(58) Field of Classification Search ................ 29/428, 29/464, 469; 81/572.9, 489
See application file for complete search history.

(56) References Cited

U.S. PATENT DOCUMENTS 4,532,832 A * 8/1985 Christensen ............... 81/57.29
5,299,475 A * 4/1994 Stroop ......................... 81/489

* cited by examiner

*Primary Examiner*—John C. Hong
(74) *Attorney, Agent, or Firm*—Rosenberg, Klein & Lee

(57) ABSTRACT

The present invention relates to a method for forming positioning grooves on torsion wrench, which is not only able to overcome the problem of high cost in milling grooves on torsion wrench, but also able to reduce material cost, the method including the steps as: First, Forming a base body of a torsion wrench; Second, Extrusion-forming positioning sleeve; Third, cutting the positioning sleeve; Fourth, assembling the positioning sleeve to the base body of the torsion wrench: Fifth, assembling adjustable ring and adjustable bushing.

1 Claim, 4 Drawing Sheets

METHOD FOR FORMING GROOVES ON TORSION WRENCH

BACKGROUND OF THE INVENTION

1. Field of the Invention

The present invention relates to a method for forming grooves on torsion wrench, and more particularly to a method that can be used to improve the production efficiency and reduce the production cost of torsion wrench.

2. Description of the Prior Arts

Conventional torsion wrench is usually provided with plural positioning grooves on an outer surface thereof, and an adjustable bushing is then mounted to the outer periphery of the plural positioning grooves, the positioning grooves serve to position the adjustable bushing. The positioning grooves are directly milled on the base body of the torsion wrench, it is time-consuming and laborsome to mill the positioning grooves with milling machine. Furthermore, since the positioning grooves are directly milled on the base body of the torsion wrench, the entire torsion wrench must be rejected if any defects occur during milling process.

Referring to FIGS. 1 and 2, wherein a conventional methods for forming grooves on torsion wrench, including the following steps:

First, Forming a base body of a torsion wrench: forming a base body 11 of a torsion wrench 10 to a predetermined size and shape;

Second, milling positioning grooves: positioning the base body 11 with positioning device, and then form plural positioning grooves 12 on end portion of the base body with milling machine;

Third, assembling adjustable ring and adjustable bushing: assembling an adjustable ring 13, and an adjustable bushing 14 to the outer periphery of the positioning grooves 12 after the positioning grooves 12 have been created, such that a conventional torsion wrench is made.

However, there are still some defects in this conventional method of forming grooves on torsion wrench, which are to explained as below:

First, in order to mill the positioning grooves 12 on the end portion of the base body 11 of a torsion wrench 10, the base body 11 has to rotate at a fixed angle with the assistance of an angle-positioning machine, and then the positioning grooves 12 can be milled. Furthermore, the respective positioning grooves 12 cannot be made at one time, so the conventional method for milling grooves on the torsion wrench is not only time-consuming but also the production cost will be increased.

Second, the positioning grooves 12 are milled on the end portion of the base body 11 of a torsion wrench 10 by milling machine, the entire base body 11 of the torsion wrench 10 must be rejected if any defective positioning grooves 12 occur during milling process, thereby the material cost is very high.

The present invention has arisen to mitigate and/or obviate the afore-described disadvantages of the conventional method for forming grooves on torsion wrench.

SUMMARY OF THE INVENTION

The primary object of the present invention is to provide a method for forming positioning grooves on torsion wrench, which is able to overcome the problem of high cost in milling grooves on torsion wrench.

The secondary object of the present invention is to provide a method for forming positioning grooves on torsion wrench, which is able to reduce material cost when defects are found in production.

In accordance with one aspect of the present invention, there is provided with a method for forming positioning grooves on torsion wrench, which including the following steps:

First, Forming a base body of a torsion wrench: forming a base body of a torsion wrench to a predetermined size and shape, at an end portion of the base body formed with a coupling portion, an annular protrusion defined on the coupling portion;

Second, extrusion-forming positioning sleeve: extrusion-forming a plurality of positioning grooves on an outer surface of a positioning sleeve;

Third, cutting the positioning sleeve: cutting the extrusion-formed positioning sleeve into predetermined length which corresponds to the length of the coupling portion of the base body;

Fourth, assembling the positioning sleeve to the base body of the torsion wrench: assembling the positioning sleeve of predetermined length to the coupling portion at the end of the base body, wherein the positioning sleeve is positioned by the annular projection, then fixed by a pin;

Fifth, assembling adjustable ring and adjustable bushing: assembling an adjustable ring and an adjustable bushing to the outer periphery of the positioning sleeve after the positioning sleeve is fixed to the end of the base body, such that a final product of torsion wrench is created.

The present invention will become more obvious from the following description when taken in connection with the accompanying drawings, which shows, for purpose of illustrations only, the preferred embodiment in accordance with the present invention.

DETAILED DESCRIPTION OF THE PREFERRED EMBODIMENT

Figure 1:
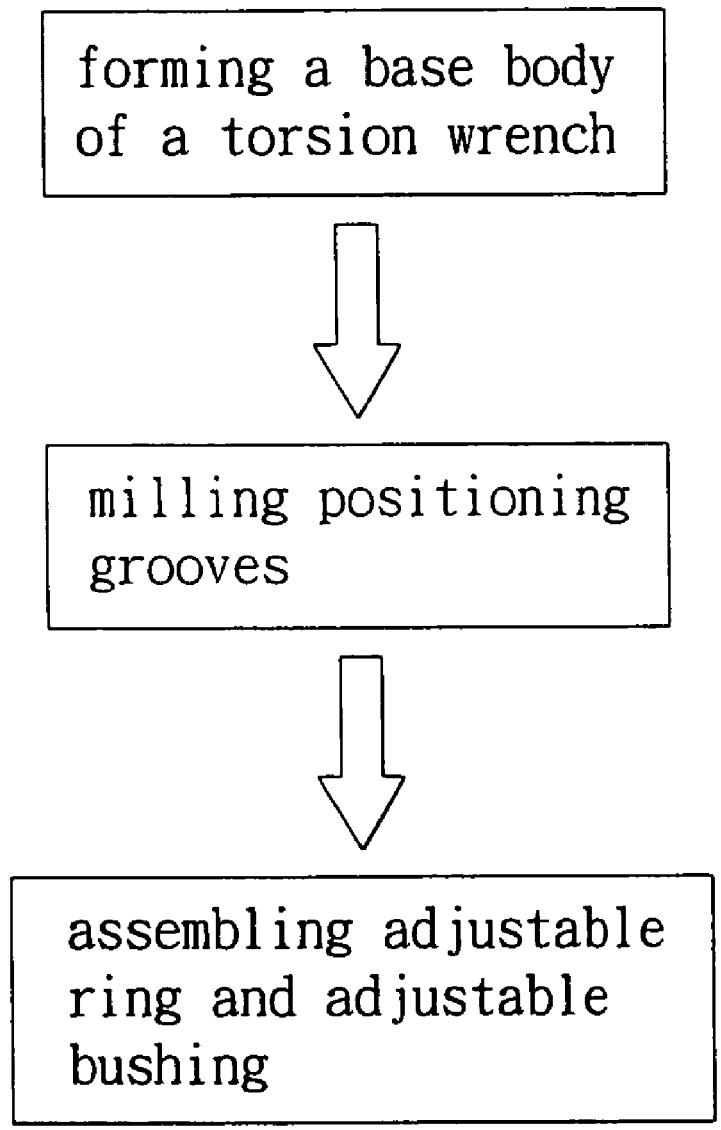
FIG. 1 is a flow chart illustrating the steps of conventional methods for milling positioning grooves on torsion wrench.
Figure 2:
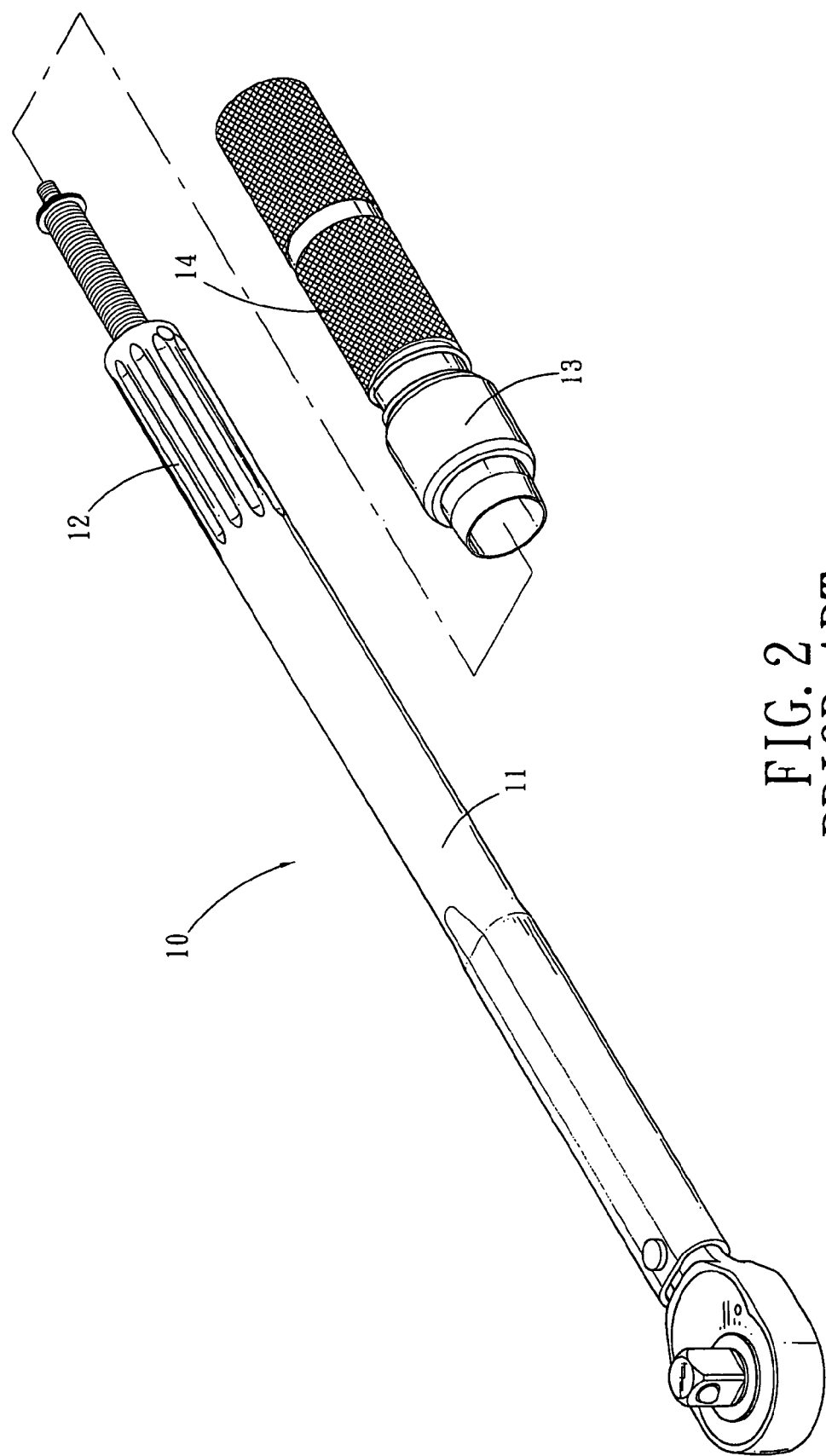
FIG. 2 is an exploded view of a conventional torsion wrench.
Figure 3:
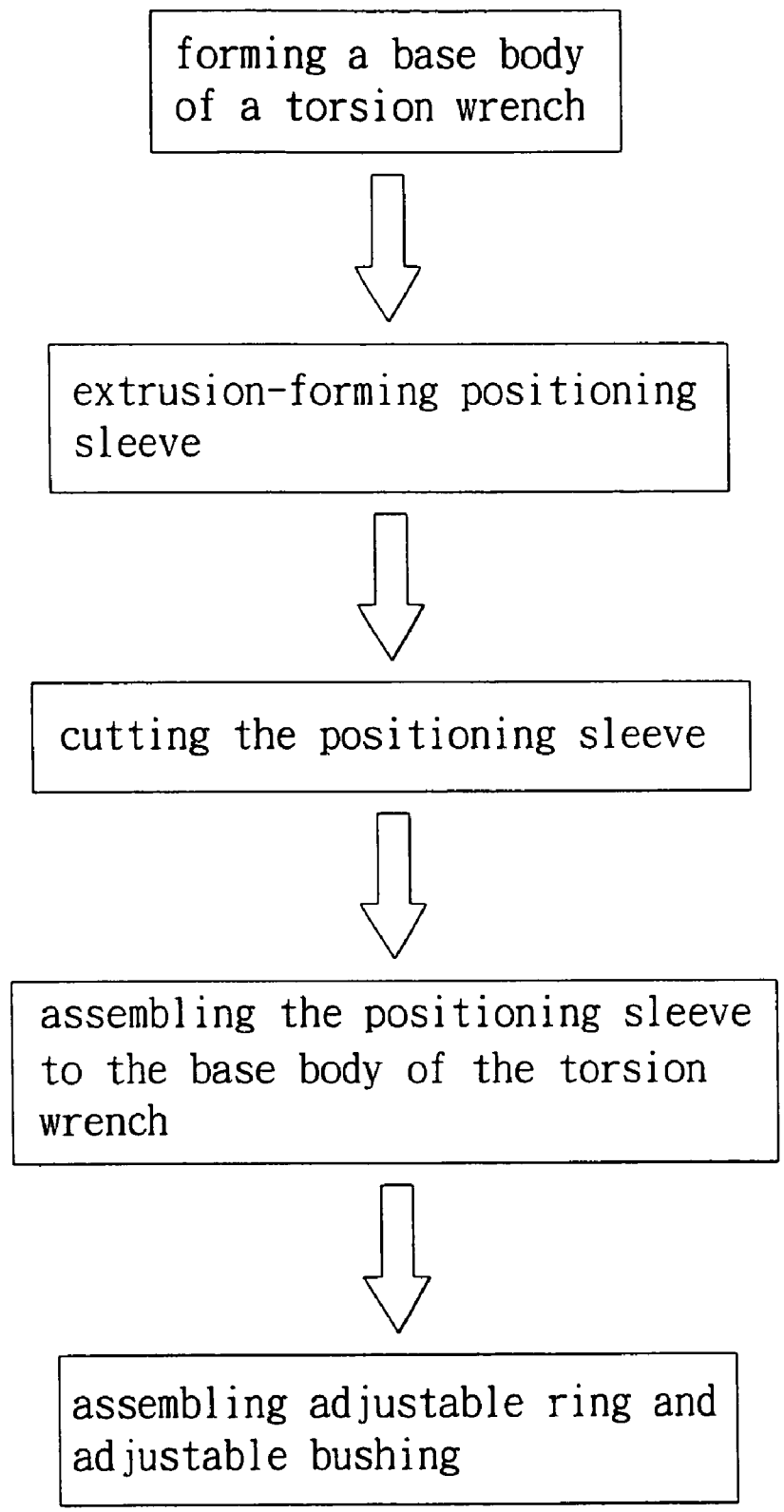
FIG. 3 is a flow chart illustrating the steps for manufacturing a torsion wrench in accordance with the techniques of the present invention.
Figure 4:
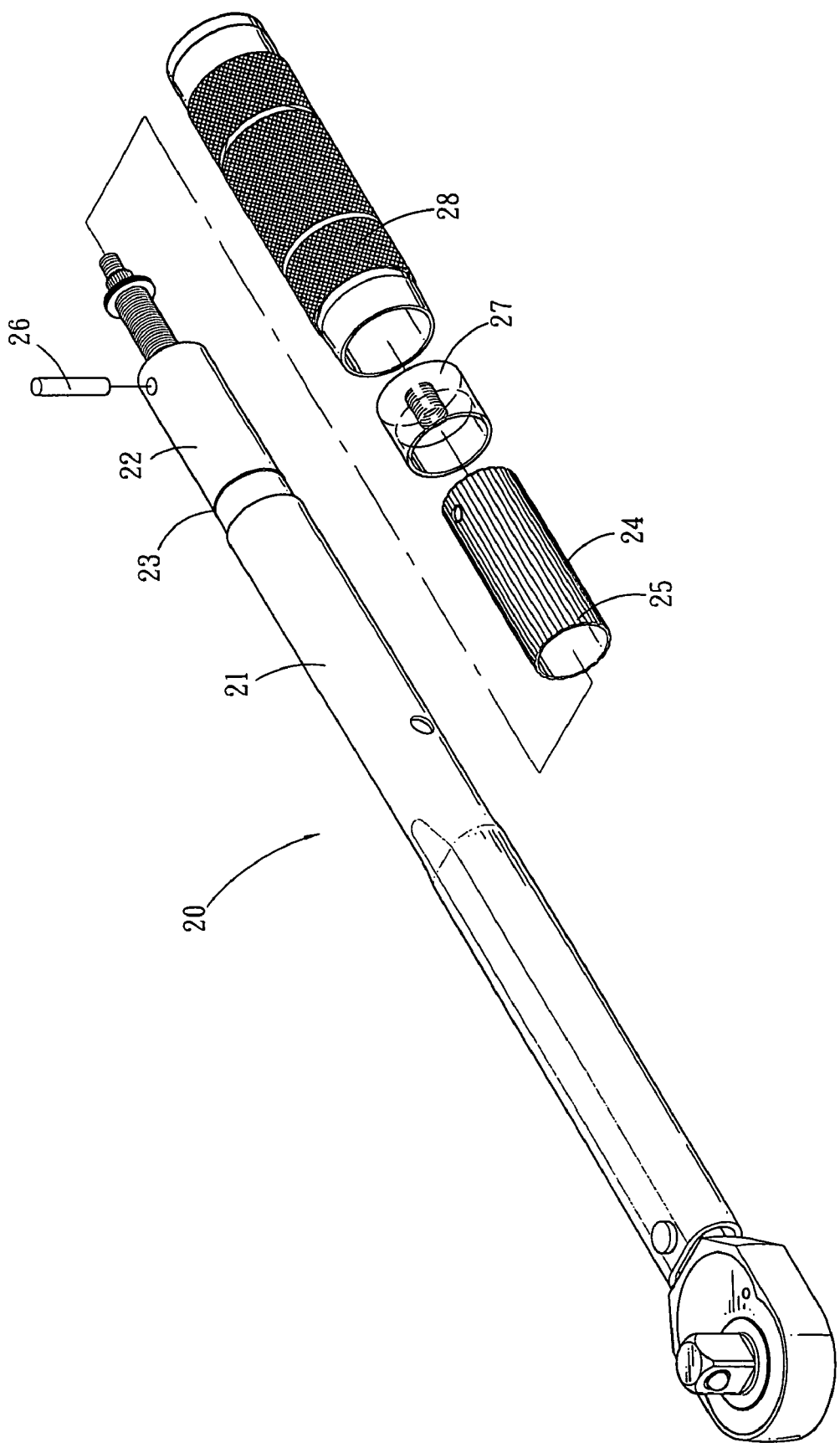
FIG. 4 is an exploded view of a torsion wrench in accordance with one aspect of the present invention.

Referring to FIGS. 3 and 4, wherein FIG. 3 is a flow chart illustrating the steps for manufacturing a torsion wrench in accordance with the techniques of the present invention, and FIG. 4 is an exploded view of a torsion wrench in accordance with one aspect of the present invention. In which, the steps for manufacturing a torsion wrench are as follows:

First, Forming a base body of a torsion wrench: forming a base body 21 of a torsion wrench 20 to predetermined size and shape, at an end portion of the base body 21 is formed with a coupling portion 22, an annular protrusion 23 is defined on the coupling portion 22, Second, Extrusion-forming positioning sleeve: extrusion-forming positioning sleeve 24, and a plurality of positioning grooves 25 are integrally formed on an outer surface of the positioning sleeve 24.

Third, Cutting positioning sleeve into predetermined length: cutting extrusion-formed positioning sleeve 24 into predetermined length.

Fourth, Assembling the positioning sleeve to the base body of the torsion wrench: Assembling the positioning sleeve 24 of predetermined length to the coupling portion 22 at the end of the base body 21, the positioning sleeve 24 is positioned by the annular projection 23, then fixed by a pin 26.

Fifth, Assembling adjustable ring and adjustable bushing: Assembling an adjustable ring 27 and an adjustable bushing 28 to outer periphery of the positioning sleeve 24 after the positioning sleeve 24 is fixed to the end of the base body 21.

Through the second step of extrusion-forming positioning sleeve and the third step of cutting positioning sleeve into predetermined length, plural positioning grooves 25 are formed on the outer periphery of the positioning sleeve 24. And the positioning sleeve 24 with positioning grooves 25 is cut into a predetermined length. In the fourth step of assembling the positioning sleeve to the base body of the torsion wrench, the positioning sleeve 24 of predetermined length is assembled to the coupling portion 22 at the end of the base body 21, and then fixed by a pin 26. Since the positioning grooves 25 are directly formed on the outer periphery of the positioning sleeve 24 by extrusion forming, and then the positioning sleeve 24 can be cut into plural pieces of predetermined length, such that the production efficiency is substantially improved. After mass production, the positioning sleeve 24 is assembled to the coupling portion 22 at the end of the base body 21 of the torsion wrench, thereby the production cost is reduced.

Furthermore, since the positioning grooves 25 are directly formed on the outer periphery of the positioning sleeve 24 by extrusion forming, and then the positioning sleeve 24 is assembled to the coupling portion 22 at the end of the base body 21 of the tension wrench, during the production, if any defective positioning grooves 25 are found during production, it only needs to replace the positioning sleeve 24 without rejecting the entire base body 21 of the torsion wrench 20. Thereby, the material cost is reduced.

While we have shown and described various embodiments in accordance with the present invention, it should be clear to those skilled in the art that further embodiments may be made without departing from the scope of the present invention.

What is claimed is:

1. A method for forming a torsion wrench, comprising the steps of:
   a. forming a base body of a torsion wrench having a predetermined size and shape, a proximal end portion of the base body being formed with a coupling portion and an annular protrusion being formed at the distal end of the coupling portion;
   b. extruding a longitudinally extended positioning sleeve body with a plurality of positioning grooves being formed to extend longitudinally on an outer surface thereof;
   c. cutting the positioning sleeve body into a plurality of positioning sleeves having a length corresponding to a length of the coupling portion of the base body, each positioning sleeve having the positioning grooves extending longitudinally between opposing ends thereof;
   d. assembling one of the plurality of positioning sleeves on the coupling portion at the proximal end of the base body, the positioning sleeve being positioned by the annular projection and then fixed to the base body by a pin passed through an opening formed in the positioning sleeve and an aligned opening formed in the base body; and,
   e. assembling an adjustable ring and an adjustable bushing to an outer periphery of the positioning sleeve after the positioning sleeve is fixed to the proximal end of the base body, such that a final product of a torsion wrench is formed.

* * * * *